United States Patent Office 3,518,139
Patented June 30, 1970

3,518,139
SHAPED ARTICLES FROM POLYURETHANES CURED WITH PHENOL BLOCKED POLYISOCYANATES
John A. Lovell, Monroe Falls, and Earl C. Graham, Akron, Ohio, assignors to The Goodyear Tire & Rubber Company, Akron, Ohio, a corporation of Ohio
No Drawing. Filed Sept. 29, 1967, Ser. No. 671,578
Int. Cl. B29h 11/00
U.S. Cl. 156—112                                    7 Claims

ABSTRACT OF THE DISCLOSURE

This invention relates to a method of forming shaped articles with fluid reactants at about 75 to 150° F. by forming a reaction mixture of a liquid reactive hydrogen containing material of about 500 to 6000 molecular weight and organic polyisocyanate which is liquid at a temperature of about 150° F. and a phenol blocked organic polyisocyanate optionally with an inert filler, placing said mixture in a shaper and reacting to obtain a shaped gumstock and curing at a temperature of at least 250° F.

---

This invention relates to a method for forming shaped articles utilizing fluid reactants wherein the shaped article can be cured at a later stage. More particularly, this invention relates to a method of preparing composite articles having good adhesion.

Solid polyurethanes of the thermoset type have been utilized for injection molding and related uses but the use of injection molding requires expensive and heavy duty equipment and relatively high temperatures and pressures to achieve the desired effect. Also, time must be utilized in removing the heat from the shaped material prior to the time it is removed from the shaper or mold. Also, solid polyurethanes of the thermoset type are more expensive than the raw materials used to make them.

A further disadvantage of injection molding the solid polyurethanes is the extreme difficulty experienced in handling the material when inert filler loadings are attempted to be used since the pressure requirements go up vary rapidly. Also, the filler loaded injection molded articles tend to be porous rather than homogeneous.

Therefore, it is an object of this invention to provide a method of forming shaped polyurethanes utilizing fluid reactants and thereby avoid the difficulties associated with the thermal injection method and also to obtain the advantage of being able to use relatively high filler loadings at low pressures.

The aforesaid object and advantages may be accomplished by forming a reaction mixture comprising one mol of a liquid reactive hydrogen containing material of about 500 to 6000 molecular weight, 0.5 to 1.0 and perferably 0.65 to 0.75 mol of an organic polyisocyanate which is a liquid at a temperature of about 150° F. and 0.05 to 0.5 and preferably 0.2 to 0.4 mol of a blocked organic polyisocyanate adduct and if desired suitable fillers and other compounding ingredients. Then the liquid reaction mixture is placed in a shaper and allowed to react to obtain a shaped gumstock at a temperature no greater than about 150° F. The shaped gumstock may be cured within the shaper or it may be removed from the shaper and cured later at a temperature of about 250° F. and preferably 50 to 75° F. higher to give a shaped article which has been made essentially from fluid reactants.

Representative of the many liquid reactive hydrogen containing materials of about 500 to 6000 molecular weight that may be used are the broad class of polyester polyols, polyether polyols and hydroxyl terminated hydrocarbon polymers and copolymers of the dienes and alpha olefins. In some instances it is desirable to reduce or emiminate the double bonds in the hydroxyl terminated hydrocarbon polymers by hydrogenation.

Specific representative members of the polyester polyol class are those prepared by the reaction of an organic polycarboxylic acid or its anhydride with an organic polyol. For instance, the carboxylic acid or its anhydride such as the aliphatic ones having from 2 to 10 or more carbon atoms or aromatic carboxylic acids and their anhydrides such as the more common ones, phthalic, terephthalic and isophthalic acids may be used to form the polyester polyol.

Representative of the organic polyols that may be used to form the polyester polyols are the polyols containing from 2 to 10 or more carbon atoms and the triols and tetrols and higher, such as the more frequently used glycerols, hexanetriols, trimethylolpropanes and trimethylolethanes, pentaerythritols and the sugar alcohols containing up to 6 hydroxyls. The lower glycols such as ethylene, propylene and butylene and their mixture are particularly preferred for this purpose to get good low temperature and strength properties.

Representative of the polyether polyols are those obtained by condensing an alkylene oxide on a suitable hydroxyl containing monomer, for instance, the above enumerated organic polyols. The more common alkylene oxides that may be used are ethylene, propylene and tetramethylene. Thus, these alkylene oxides containing from 2 to 10 or more carbon atoms may be condensed to form polyethers containing 2, 3 or more hydroxyls, for instance, 7 or 8 depending upon the nucleus generating material on which the alkylene oxide is condensed.

Hydroxyl terminated hydrocarbon polymers useful in this invention may also be produced by hydroxyl terminating the polymer form by the polymerization of a conjugated diolefin or other diolefins alone on in conjunction with an alpha olefin. Usually the polymerization and hydroxyl termination of the polymers are achieved by the use of hydrogen peroxide as the catalyst, or alkali metals followed by treating the alkali metal adduct formed between the polymerizing diene and the alkali metal with an alkylene oxide and then hydrolizing away the metal.

Any of the organic polyisocyanates may be utilized in this invention. Representative examples of the organic isocyanates are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4 and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 2,4-tolylene, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanate triphenyl methane, 1,3,5-triisocyanato benzene, and 2,4,6-triisocyanato toluene; and the tetraisocyanates such as 4,4'-dimethyl-diphenyl methane-2,2',5,5'-tetraisocyanate.

Representative of the blocked organic polyisocyanate adducts useful in this invention may be mentioned those formed by reacting a mercaptan with any of the isocyanates listed above or a phenol with any of the isocyanates listed above.

Some specific blocked organic isocyanate adducts useful in this invention are those obtained by reacting phenol with 4,4'-diphenyl diisocyanate, toluene diisocyanate, and 4,4'-diphenylene methane diisocyanate.

The nature of this invention may be more specifically illustrated by reference to typically representative examples wherein the parts are by weight and the hydroxyl values are expressed as milliequivalents per gram.

EXAMPLE

A liquid polybutadiene (100 parts) with a hydroxyl value of .77 milliequivalents per gram was mixed with 25 parts of HAF carbon black and 3.4 parts of a phenol block methylene di(phenylene isocyanate) and .05 parts of dibutyl tin dilaurate and to this mixture was then added 3.96 parts of toluene diisocyanate (commercial grade 80/20 isomers). This mixture was immediately poured into a mold having the shape of a solid tire and allowed to stand until the mixture had reacted and set at room temperature (ca. 75° F.). Then the mixture was placed in an oven at about 250° F. for 15 minutes before the solid tire was removed from the mold to give a shaped article formed from the fluid reaction mixture.

The above reaction mixture was utilized also to coat a nylon tire cord fabric to give a fabric suitable for forming a tire. When the reaction mixture had set the coated fabric was covered with a ply of uncoated nylon tire cord fabric to form a laminate. Then this laminate was placed in a press and cured at 300° F. for 15 minutes. The resulting cured laminate could not have the plies separated without tearing the fabric.

On the other hand, a nylon tire cord fabric laminate prepared using the above recipe where the reaction mixture did not contain a blocked methylene di(phenylene isocyanate), was press cured in laminating relationship with an untreated nylon tire cord fabric to give a cured laminate. This cure laminate could be readily torn apart as the adhesion between the two fabrics was deficient.

It should be noted that this adhesive technique would permit a tire building band or chafing strip to be formed and then these to be assembled in the normal manner utilized in building a tire. Then the resulting composite could be placed in a mold where the band can be shaped by inflating a pneumatic bladder within the mold and then be cured in a tire mold to give a tire that is a composite laminate of polyurethane or other rubbers adhered together by means of the adhesive described herein to permit tires and other rubber articles to be fabricated more readily.

Instead of the hydroxyl terminated polybutadiene, a diol of a copolymer of butadiene and styrene having a molecular weight of about 2000 was used in another example to form a shaped plug. Also, a hydroxyl terminated polyisoprene of about 2000 to 3000 molecular weight was used instead of the hydroxyl terminated polybutadiene to form a coating according to the procedure of the example. The polyester polyols and polyether polyols may also be used but the amount of filler normally will be used in about 5 to 20 parts per 100 parts of said reactive hydrogen containing polyols.

Thus, by the above method about 5 to 100 parts and preferably about 20 to 60 parts of an inert filler such as the carbon blacks may be used to enhance the physical properties without materially affecting energy required to incorporate the filler and move the reaction mixture to the shaper.

While certain representative embodiments and details have been shown for the purpose of illustrating the invention, it will be apparent to those skilled in the art that various changes and modifications may be made therein without departing from the spirit or scope of the invention.

What is claimed is:

1. A method for forming shaped articles with fluid reactants at about 75 to 150° F. comprising (1) forming a reaction mixture comprising a liquid reactive hydrogen containing material of about 500 to 6000 molecular weight, an organic polyisocyanate, which is a liquid at a temperature of about 150° F. and a phenol-blocked organic polyisocyanate, placing said mixture in a shaper and reacting to obtain a shaped gumstock at a temperature no greater than about 150° F. and then curing the shaped gumstock at a temperature of at least 250° F.

2. The method of claim 1 wherein about 0.5 to 1.0 mol of organic polyisocyanate and 0.05 to 0.5 mol of the phenol-blocked organic polyisocyanate is used for each mol of reactive hydrogen containing material.

3. The method of claim 1 wherein the reaction mixture has incorporated therein about 5 to 100 parts of an inert filler prior to the time the reaction mixture is placed in a shaper.

4. The method of claim 2 wherein the reactive hydrogen containing material is a hydrocarbon polyol.

5. The method of claim 4 wherein the blocked organic polyisocyanate is methylene di(phenylene isocyanate).

6. The method of claim 1 wherein the curing of the shaped gumstocks at a temperature of at least 250° F. occurs in contact with another member to give a cured shaped composite.

7. The method of claim 6 wherein the shaped gumstock is placed in contact with another member to form a laminate and the laminate is then shaped and cured.

References Cited

UNITED STATES PATENTS

| | | |
|---|---|---|
| 2,417,792 | 3/1947 | Verbanc. |
| 3,338,861 | 8/1967 | Mastin et al. |
| 3,395,114 | 7/1968 | Smith. |

LELAND A. SEBASTIAN, Primary Examiner

U.S. Cl. X.R.

156—110, 242; 260—37, 77.5; 264—326